(12) United States Patent
Maienschein et al.

(10) Patent No.: US 9,689,462 B2
(45) Date of Patent: Jun. 27, 2017

(54) CENTRIFUGAL PENDULUM DEVICE FOR VIBRATION ISOLATION

(71) Applicant: Schaeffler Technologies GmbH & Co. KG, Herzogenaurach (DE)

(72) Inventors: Stephan Maienschein, Baden-Baden (DE); Thorsten Krause, Buehl (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 121 days.

(21) Appl. No.: 14/408,428

(22) PCT Filed: Jul. 3, 2013

(86) PCT No.: PCT/EP2013/064053
§ 371 (c)(1),
(2) Date: Dec. 16, 2014

(87) PCT Pub. No.: WO2014/006101
PCT Pub. Date: Jan. 9, 2014

(65) Prior Publication Data
US 2015/0240912 A1 Aug. 27, 2015

(30) Foreign Application Priority Data

Jul. 6, 2012 (DE) .................. 10 2012 211 826

(51) Int. Cl.
*F16F 15/14* (2006.01)
*F16D 13/70* (2006.01)
*F16F 15/31* (2006.01)

(52) U.S. Cl.
CPC ............ *F16F 15/145* (2013.01); *F16D 13/70* (2013.01); *F16F 15/31* (2013.01); *F16D 2300/22* (2013.01); *Y10T 74/2128* (2015.01)

(58) Field of Classification Search
CPC ....... F16F 15/14; F16F 15/31; Y10T 74/2128; F16D 2021/0615
See application file for complete search history.

(56) References Cited

U.S. PATENT DOCUMENTS

| 2003/0079953 A1* | 5/2003 | Carlson ................... F16D 21/06 192/48.8 |
| 2010/0242466 A1* | 9/2010 | Krause .................. F16F 15/145 60/327 |

(Continued)

FOREIGN PATENT DOCUMENTS

| DE | 102009052055 A1 | 10/2010 |
| DE | 102010049930 A1 | 5/2011 |

(Continued)

*Primary Examiner* — Richard Lorence
*Assistant Examiner* — Lillian Nguyen
(74) *Attorney, Agent, or Firm* — Simpson & Simpson, PLLC

(57) ABSTRACT

A centrifugal pendulum device for vibration isolation of a power take-off system of a drive unit, having a first pendulum element with a first mass and a second pendulum element with a second mass, which are set up to counteract vibrations of the drive unit in a resonance range. The first pendulum element has a first resonance range and the second pendulum element has a second resonance range, where the first and the second resonance ranges differ. Using the centrifugal pendulum device it is possible in a small construction space using efficient means to isolate an extended frequency range of vibrations from the drivetrain. In particular, with drive units which are designed as internal combustion engines having activatable cylinders, it is possible, using the centrifugal pendulum device proposed here to achieve a vibration isolation for many states of the drive unit.

7 Claims, 4 Drawing Sheets

(56) References Cited

U.S. PATENT DOCUMENTS

| | | | | |
|---|---|---|---|---|
| 2010/0269497 A1* | 10/2010 | Engelmann | ........... | F16F 15/145 60/338 |
| 2011/0179782 A1* | 7/2011 | Huegel | ............. | F16F 15/13128 60/338 |
| 2012/0180473 A1* | 7/2012 | Huegel | ............. | F16F 15/12373 60/435 |
| 2012/0305358 A1* | 12/2012 | Maienschein | ......... | F16F 15/145 192/3.28 |
| 2013/0025995 A1* | 1/2013 | Krebs | .................... | F16D 21/06 192/48.8 |
| 2013/0239745 A1* | 9/2013 | Maienschein | ......... | F16F 15/145 74/574.2 |
| 2014/0151181 A1* | 6/2014 | Reimnitz | ................ | F16D 21/06 192/30 V |

FOREIGN PATENT DOCUMENTS

| | | | | |
|---|---|---|---|---|
| EP | 2743541 A2 * | 6/2014 | ......... | F16F 15/1395 |
| WO | 2012079557 A1 | 6/2012 | | |

\* cited by examiner

CENTRIFUGAL PENDULUM DEVICE FOR VIBRATION ISOLATION

CROSS-REFERENCE TO RELATED APPLICATIONS

The present application is the United States national stage application pursuant to 35 U.S.C. §371 of International Application No. PCT/EP2013/064053, filed on Jul. 3, 2013, which application claims priority from German Patent Application No. DE 10 2012 211 826.8, filed on Jul. 6, 2012, which applications are incorporated herein by reference in their entireties.

TECHNICAL FIELD

The invention relates generally to a centrifugal pendulum device for vibration isolation of a power take-off system of a drive unit, wherein the centrifugal force is used to accelerate a vibrating suspended mass, in order to thereby produce a counter-vibration to an input vibration.

BACKGROUND OF THE INVENTION

With conventional internal combustion engines as drive units in particular, vibrations can result, especially when starting the internal combustion engine, which should not be transmitted to the rest of the system if possible. A centrifugal pendulum device having pendulum elements which counteract the vibrations of a drive unit in a resonance range has proven to be especially effective for this purpose. It has turned out, however, that known centrifugal pendulum devices are only very limitedly effective; that is, for only one or a few states of the drive unit.

BRIEF SUMMARY OF THE INVENTION

According to aspects illustrated here, there is provided a centrifugal pendulum device for providing vibration isolation in a power take-off system in a drive unit including a first pendulum element having a first mass, the first pendulum element operatively arranged to counteract vibrations of the drive unit in a first resonance range and a second pendulum element having a second mass, the second pendulum element operatively arranged to counteract vibrations of the drive unit in a second resonance range. The first and second resonance ranges differ.

According to aspects illustrated here, there is provided a centrifugal pendulum device for vibration isolation of a power take-off system of a drive unit which has at least one first pendulum element with a first mass and one second pendulum element with a second mass, which is set up to counteract vibrations of the drive unit in a resonance range. In an example embodiment, the first pendulum element has a first resonance range and the second pendulum element has a second resonance range, the first and second resonance ranges being different.

A primary object of the invention is to provide a centrifugal pendulum device made up primarily of pendulum elements which each have a mass, and are suspended on a constantly or activatably rotating element in such a way that they can vibrate in a predetermined resonance range as a result of centrifugal force. This vibration is thus activated only by the present centrifugal force, which results in acceleration of the pendulum elements. When a vibration in the resonance range of the pendulum elements is superimposed on the rotational motion, the pendulum elements are set into vibration in such a way that the superimposed vibration is (almost) canceled out. Such a pendulum element is, for example, a flat component which is held at two points by means of bolts, the bolts being received in the pendulum element in elongated holes, so that the pendulum element can vibrate in a resonance range along the elongated holes through the bolts.

A further object of the invention is to provide at least one first pendulum element and one second pendulum element, each of which has a differing first and second resonance range. The resonance range is defined in each case by a specific resonance frequency for which the respective pendulum element has been designed. The resonance range is either the technically realizable actual resonance of the pendulum element, or an extension of the resonance frequency range according to the design. As a rule, a concentration of resonance frequency results, with a maximum in the resonance frequency with very steep rise and fall, which corresponds approximately to a uniform distribution around the resonance frequency. The first and second resonance ranges differ essentially by the maximum central resonance frequency, and otherwise may overlap. In particular, the first and the second resonance range are designed so that they have no overlapping zones. The resonance ranges may also include uniform distributions around higher order resonance frequencies. Thus, with the centrifugal pendulum device proposed here, a vibration isolation for at least two resonance ranges can be achieved without the need for an additional damping device.

In another advantageous embodiment of the centrifugal pendulum device, at least one additional pendulum element is provided, which has the first, the second, or another resonance range.

Various objectives can be achieved through the provision of an additional pendulum element. For example, a suppression of a static or dynamic imbalance can be achieved, if the at least one additional pendulum element is designed so that an equalizing moment to the first and/or second pendulum element is achieved. Furthermore, the isolatable frequency range of the vibrations can be expanded by the at least one additional pendulum element.

In another advantageous embodiment of the centrifugal pendulum device, the resonance ranges are adjusted by at least one of the following measures: suspending the pendulum elements at various radii, providing different oscillation path tracks of the pendulum elements, differing masses of the particular pendulum element, suspending the pendulum elements on various oscillation elements and/or guiding the pendulum elements on unequal motion paths.

The effect of the centrifugal force on the respective pendulum elements is influenced by suspending the pendulum elements at various radii. This results in a different acceleration, i.e., natural frequency, and a different response behavior. Through the use of different oscillation path tracks in the respective pendulum element, i.e., for example, through the geometry of the elongated holes on which a particular pendulum element is suspended on bolts, the vibration characteristic and thus the resonance ranges are influenced. Furthermore, through suitable oscillation path tracks, superimposed vibration motion of a pendulum element can also be attained. For example, besides a parallel vibration a pendulum element may likewise describe a rotational vibration. Through the provision of different masses on a particular pendulum element, the resonance frequency of the particular pendulum element is changed, because the natural frequency of the particular pendulum element is changed. An additional measure is the suspension of the particular pendulum elements on various oscillation elements. In this way, influence can be exerted on the resonance range through the property of the oscillation elements. In particular with activatable oscillation elements, the effect of the centrifugal pendulum device and thus the resonance range of the pendulum element can be influenced.

According to another aspect of the invention, a vibration equalization device is also proposed, which has at least the following components: at least one shaft for transmitting a torque, at least one flywheel, which is rotationally fixed on one of the at least one shafts and extends radially, and at least one centrifugal pendulum device according to the above description, which is situated on one of the at least one flywheels.

The at least one shaft transmits a torque, and has a vibration superimposed, especially occasionally. This shaft is in particular an input shaft and/or an output shaft. The input shaft is, for example, the output shaft of a drive unit, and the at least one output shaft is a transmission shaft of the power take-off system. The at least one flywheel extends radially outward, and is driven through the fixing on the at least one shaft. In this case, the flywheel alone can serve as a fastening element for the centrifugal pendulum device, or incidentally may smooth the flow of torque by its mass, or may even have expanded damping properties by means of damper elements. In this case, the centrifugal pendulum device corresponds to the device described above, which can thus replace expensive external damper elements.

In another advantageous embodiment of the vibration equalization device, the first pendulum element and the second pendulum element are situated on a common flywheel.

For many applications, it is important that the vibration equalization device occupy only a small construction space. This can be achieved by having the pendulum elements with the various resonance ranges situated on the common flywheel. In this case, the pendulum elements may overlap each other, or be situated side by side on a circumference, situated on the common flywheel offset toward the inside, or provided on the front side and back side of the flywheel. In addition, the pendulum elements with their masses may at the same time form a part of the mass for the flywheel, which can act to smooth out the speed of rotation and the torque. This keeps the total mass to be moved low, and thus increases the efficiency.

In another advantageous embodiment of the vibration equalization device, the at least one flywheel is formed by one of the following components a damper, a pressing plate, a central carrier or a clutch housing.

The positioning of the centrifugal pendulum device on one of the named components results in an integral construction design, which results in a small overall construction size. In addition, complex properties of the centrifugal pendulum device or of the vibration equalization device can be achieved. In particular when the damper is used as a flywheel, the damping motions can inhibit an unnecessary rising of the pendulum elements. Moreover, the pendulum elements can calm the damper when vibrations are present, so that the damper elements are spared.

In another advantageous embodiment of the vibration equalization device, in each case a plurality of similar pendulum elements is arranged symmetrically on a common flywheel.

Through such a symmetrical arrangement of the pendulum elements on a common flywheel, static and dynamic imbalances are avoided. A symmetrical arrangement here is, for example, the positioning in each case of two diametrically oppositely located pendulum elements, so that, for example, a total of four pendulum elements are situated on a common flywheel, or, for example, three like pendulum elements which are positioned at intervals of 120° from each other. A symmetrical arrangement is easily controllable and especially cost-effective.

According to another aspect of the invention, a friction clutch is also proposed for detachably connecting a drivetrain to a drive unit, which includes at least the following components: a friction system having at least one pressing plate and at least one friction disk, a clutch housing in which the at least one pressing plate is rotationally fixed, an input shaft, at least one output shaft and a vibration equalization device according to the above description.

The friction system constitutes the central unit of the friction clutch, by means of which the friction shaft can be separated from the at least one output shaft or can be connected to an output shaft. This takes place through at least one pressing plate, which is pressed against at least one friction disk, so that between the at least one pressing plate and the at least one friction disk a friction force is present which enables the transmission of a torque from the input shaft to one of the output shafts. When the pressing force is canceled, no torque or only a negligible torque is transmitted. The clutch housing, in which the at least one pressing plate is rotationally fixed and is axially movable for pressing against a friction disk, normally rotates with the input shaft. Other configurations are also conceivable, however. The at least one output shaft is connected to at least one friction disk, so that when the pressing plate is in the pressed state a torque is transmitted from the input shaft to an output shaft. In this case, a vibration equalization device according to the invention is now provided. The result of this is that directly when the torque is transmitted from the input shaft to the at least one output shaft, vibrations are equalized directly during the transmission.

According to another aspect of the invention, a motor vehicle is also provided which has a drive unit with an output shaft, a drivetrain and a friction clutch, where the drive unit in the motor vehicle is positioned in front of the driver's compartment and transversely to a longitudinal axis of the motor vehicle.

Most motor vehicles today have front wheel drive, and therefore by preference position the drive unit, for example, an internal combustion engine or an electric motor, in front of the driver's compartment and transversely to the main direction of travel. The construction space is especially tight particularly in such an arrangement, and it is therefore particularly advantageous to use a clutch of smaller size.

The construction space situation becomes more critical in the case of passenger cars of the small class according to European classification. The assemblies used in a passenger car of the small class are not significantly smaller compared to passenger cars of larger classes. Nevertheless, the available construction space is substantially reduced in small cars. The friction clutch described above is especially well suited for use in small vehicles, because construction-space-intensive external damper elements are not required. Passenger cars are classified in a vehicle class for example according to size, price, weight, power, this definition being subject to constant change according to the needs of the market. In the US market, vehicles of the small car and smallest car class according to European classification are classified as subcompact cars, and in the British market they correspond to the class of super minis, for example, the city car class. Examples of the smallest car class are a Volkswagen Fox or a Renault Twingo. Examples of the small car class are an Alfa Romeo Mito, Volkswagen Polo, Ford Fiesta or Renault Clio.

The figures show especially preferred exemplary embodiments, to which the invention is not limited, however. In particular, it must be pointed out that the figures, and especially the depicted size proportions, are only schematic.

These and other objects, advantages and features of the present invention will be better appreciated by those having ordinary skill in the art in view of the following detailed description of the invention in view of the drawings.

BRIEF DESCRIPTION OF THE SEVERAL VIEWS OF THE DRAWINGS

The invention as well as the technical environment will now be described in greater detail by reference to the accompanying figures, in which the figures represent the following.

DETAILED DESCRIPTION OF THE INVENTION

At the outset, it should be appreciated that like drawing numbers on different drawing views identify identical, or functionally similar, structural elements of the invention. While the present invention is described with respect to what is presently considered to be the preferred aspects, it is to be understood that the invention as claimed is not limited to the disclosed aspects.

Furthermore, it is understood that this invention is not limited to the particular methodology, materials and modifications described and, as such, may, of course, vary. It is also understood that the terminology used herein is for the purpose of describing particular aspects only, and is not intended to limit the scope of the present invention, which is limited only by the appended claims.

Unless defined otherwise, all technical and scientific terms used herein have the same meaning as commonly understood to one of ordinary skill in the art to which this invention belongs. Although any methods, devices or materials similar or equivalent to those described herein can be used in the practice or testing of the invention, the preferred methods, devices, and materials are now described.

Figure 1:
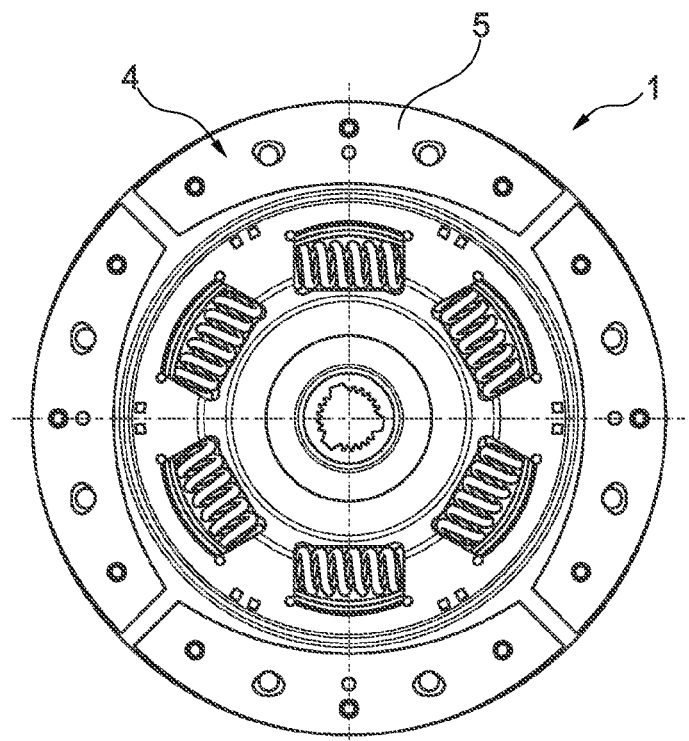
FIG. 1 is a centrifugal pendulum device on a damper.
Figure 2:
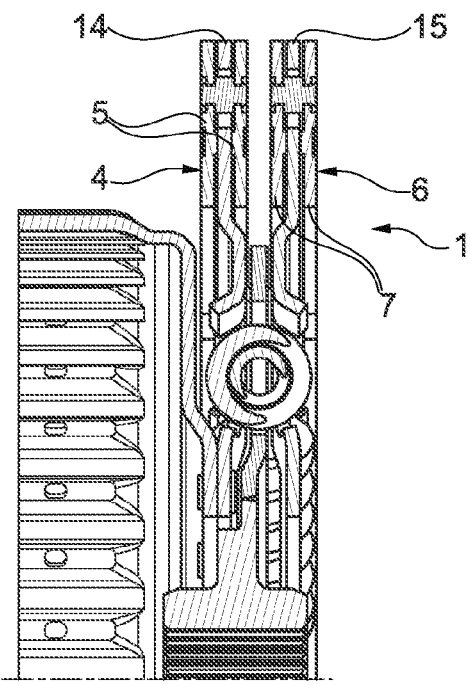
FIG. 2 is a centrifugal pendulum device having two pendulum elements on a damper.

FIGS. 1 and 2 show centrifugal pendulum device 1 having first pendulum element 4 with first mass 5, which is suspended on first damper 14. FIG. 2 shows, for example, centrifugal pendulum device 1 from FIG. 1 in cross section, it being apparent that first damper 14 and second damper 15 are used. First pendulum element 4 having first mass 5 and second pendulum element 6 having second mass 7.

Figure 3:
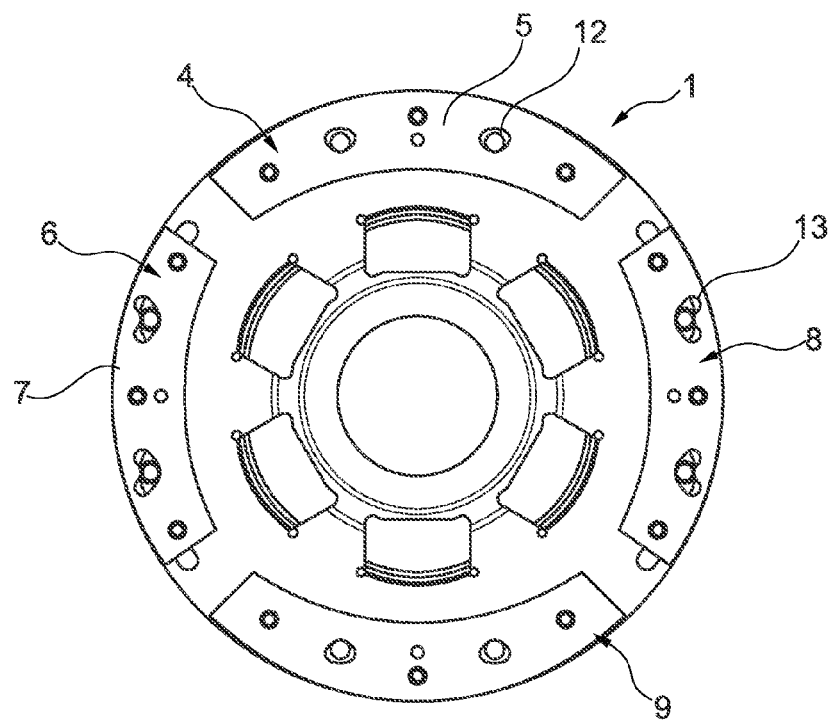
FIG. 3 is a centrifugal pendulum device having two different oscillation path tracks.
Figure 4:
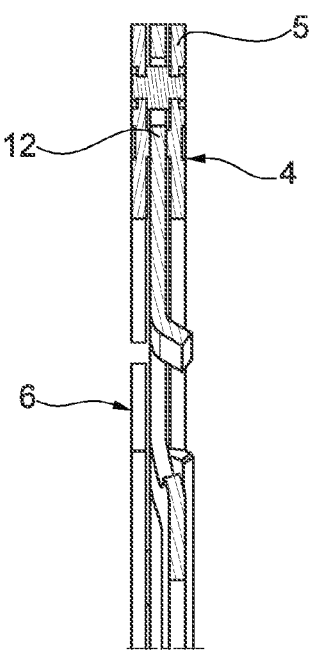
FIG. 4 is a centrifugal pendulum device with oscillation path limit.

FIG. 3 shows another embodiment of centrifugal pendulum device 1, wherein first pendulum element 4 having first mass 5 and second pendulum element 6 having second mass 7 are used. First pendulum element 4 here has first oscillation path limit 12 and second pendulum element 6 has second oscillation path limit 13, which differ from each other. In addition, first mass 5 and second mass 7 differ. Furthermore, two additional pendulum elements 8, 9 are employed, which are arranged symmetrically, which here means diametrically opposite each other. FIG. 4 depicts centrifugal pendulum device 1 such as, for example, in FIG. 3, in cross section. First pendulum element 4 having first mass 5 is suspended here at first oscillation path limit 12. Second pendulum element 6 is also recognizable.

Figure 5:
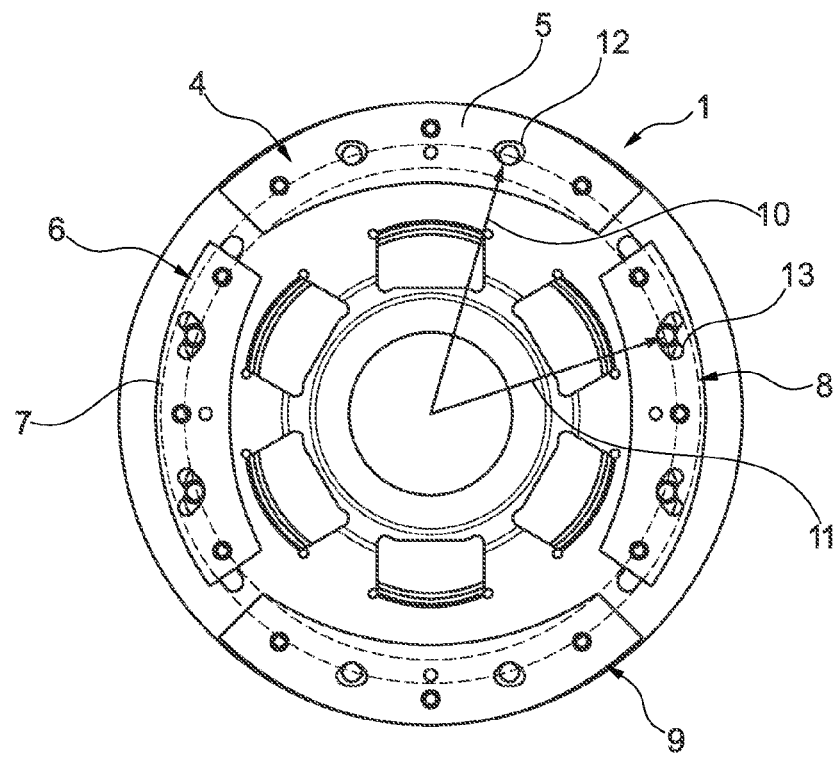
FIG. 5 is a centrifugal pendulum device with differing suspension radii.

FIG. 5 shows another embodiment of centrifugal pendulum device 1, wherein first pendulum element 4 having first mass 5 is suspended at first radius 10 and second pendulum element 6 having second mass 7 is suspended at second radius 11. Here again, two additional pendulum elements 8, 9 are depicted symmetrically. Second additional pendulum element 9 and first pendulum element 4 are suspended in first oscillation path limit 12, and second pendulum element 6 as well as first additional pendulum element 8 are suspended at second oscillation path limit 13.

Figures 6, 7:
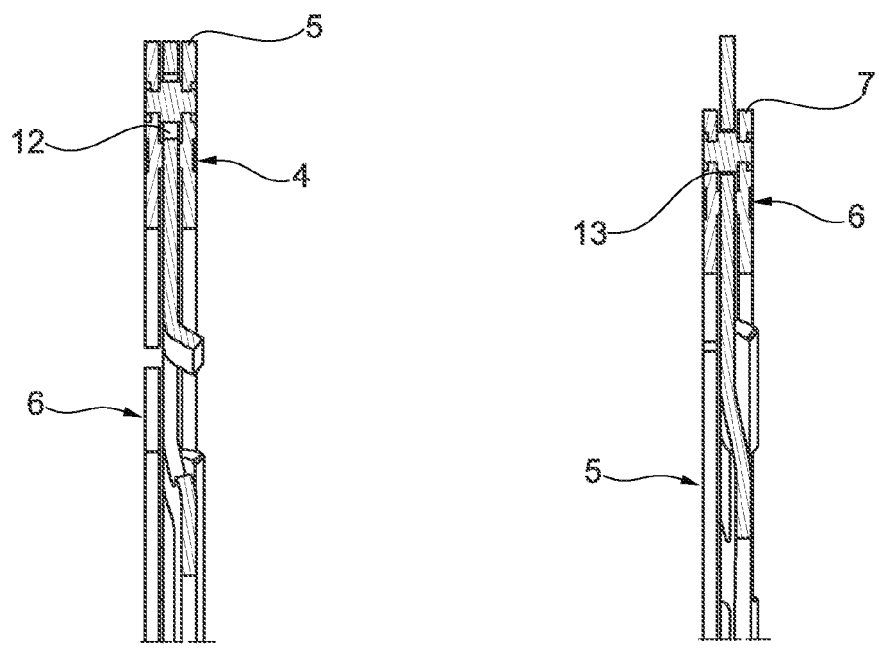
FIG. 6 is a centrifugal pendulum device in cross section with a first radius.
FIG. 7 is a centrifugal pendulum device in cross section with a second radius.

FIG. 6 depicts centrifugal pendulum device 1 in cross section, as it is shown, for example, in FIG. 5. First pendulum element 4 with first mass 5 is shown here, which is situated at first radius 10 with first oscillation path limit 12. Furthermore, second pendulum element 6 is also recognizable.

FIG. 7 shows a similar cross section to that in FIG. 6 through centrifugal pendulum device 1, where here second pendulum element 6 having second mass 7 may be seen suspended at second oscillation path limit 13 at second radius 11. Furthermore, first pendulum element 4 is also depicted.

Figure 8:
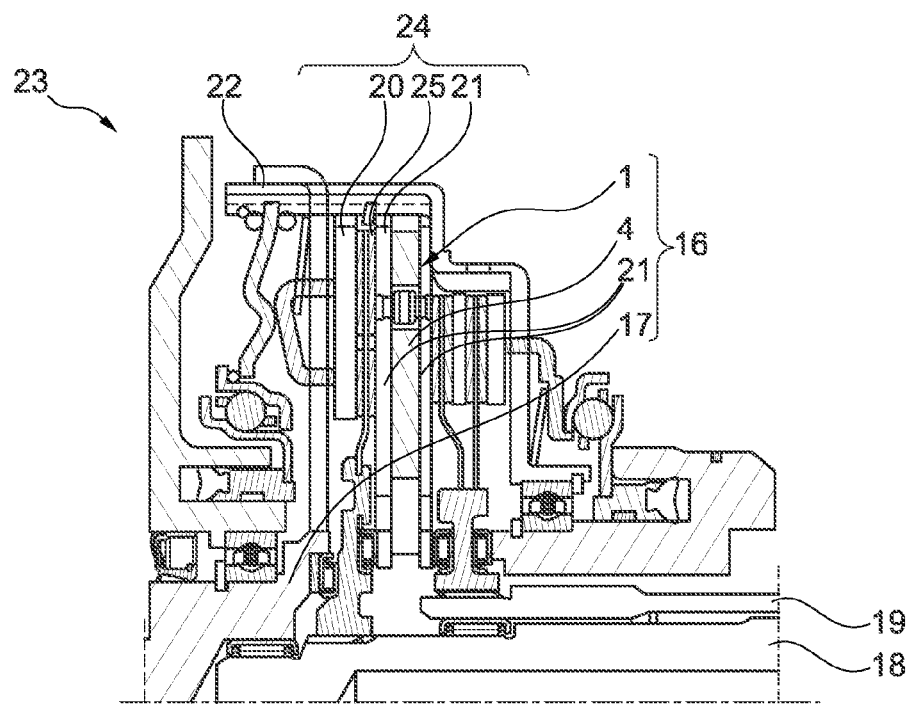
FIG. 8 is a vibration equalization device.

FIG. 8 shows friction clutch 23 in which vibration equalization device 16 having centrifugal pendulum device 1 is visible in cross section. Friction clutch 23 depicted in FIG. 8 is a dual clutch having central carrier 21, only the relevant elements being designated here. Friction clutch 23 has input shaft 17, to which clutch housing 22 is connected. Situated in clutch housing 22 is pressing plate 20, as well as central carrier 21, axially movable and rotationally fixed. Between pressing plate 20 and central carrier 21 friction disk 25 is provided, so that these elements together form friction system 24. Through it first output shaft 18 is frictionally connectable to input shaft 17. Situated in central carrier 21 is centrifugal pendulum device 1, of which first pendulum element 4 is recognizable in cross section. Centrifugal pendulum device 1, central carrier 21 and input shaft 17 form vibration equalization device 16. Also shown is second output shaft 19, which is likewise frictionally connectable to input shaft 17.

Figure 9:
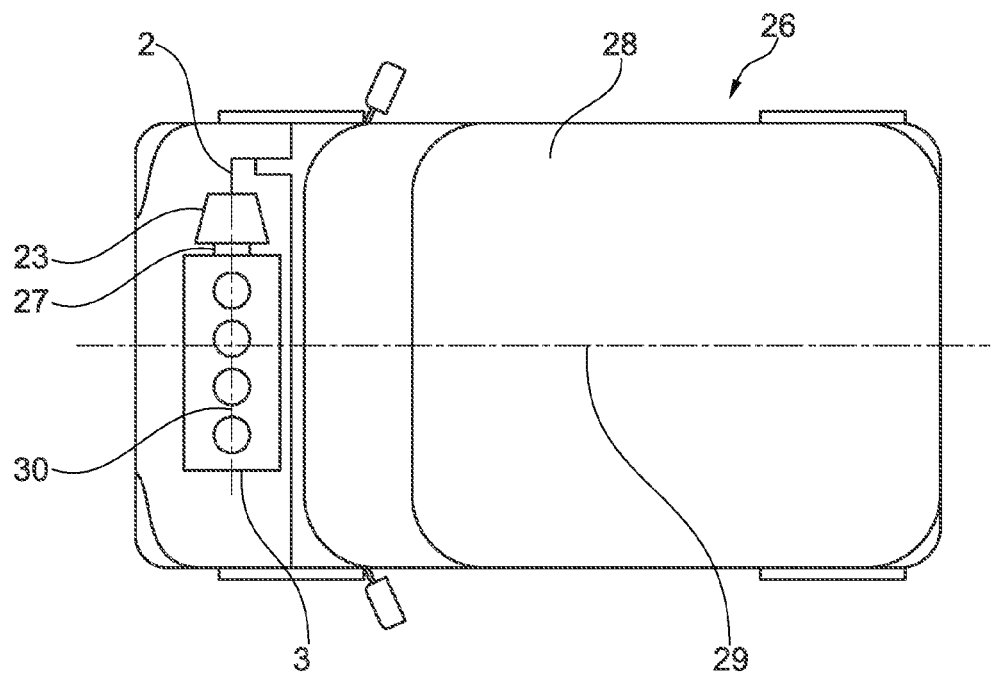
FIG. 9 is a motor vehicle having a friction clutch.

FIG. 9 shows motor vehicle 26, in which drive unit 3 is situated ahead of driver's compartment 28. Drive unit 3 is connected through drive shaft 27 and schematically depicted friction clutch 23 to schematically depicted drivetrain 2. Drive unit 3 has its motor axis 30 oriented transversely to longitudinal axis 29 of motor vehicle 26.

Using the centrifugal pendulum device, or vibration equalization device, proposed here, it is possible in a small construction space using efficient means to isolate an extended frequency range of vibrations from the drivetrain. In particular with drive units which are designed as internal combustion engines having activatable cylinders, it is possible, using the centrifugal pendulum device proposed here, to achieve vibration isolation for many states of the drive unit.

Thus, it is seen that the objects of the present invention are efficiently obtained, although modifications and changes to the invention should be readily apparent to those having ordinary skill in the art, which modifications are intended to be within the spirit and scope of the invention as claimed. It also is understood that the foregoing description is illustrative of the present invention and should not be considered as limiting. Therefore, other embodiments of the present invention are possible without departing from the spirit and scope of the present invention.

LIST OF REFERENCE NUMBERS

1 Centrifugal pendulum device
2 Drivetrain
3 Drive unit
4 First pendulum element
5 First mass
6 Second pendulum element
7 Second mass
8 First additional pendulum element
9 Second additional pendulum element
10 First radius
11 Second radius
12 First oscillation path limit
13 Second oscillation path limit
14 First flywheel
15 Second flywheel
16 Vibration equalization device
17 Input shaft
18 First output shaft
19 Second output shaft
20 Pressing plate
21 Central carrier
22 Clutch housing
23 Friction clutch
24 Friction system
25 Friction disk
26 Motor vehicle
27 Output shaft
28 Driver's compartment
29 Longitudinal axis
30 Motor axis

What is claimed is:

1. A vibration equalization device, comprising:
at least one shaft for transmitting torque;
a first flywheel rotationally fixed on said at least one shaft and extending radially;
a second flywheel rotationally fixed on said at least one shaft and extending radially; and,
a centrifugal pendulum device for providing vibration isolation in a power take-off system in a drive unit, comprising:
a first pendulum element having a first mass, the first pendulum element operatively arranged on the first flywheel to counteract vibrations of the drive unit in a first resonance range; and,
a second pendulum element having a second mass, said second pendulum element operatively arranged on the second flywheel to counteract vibrations of said drive unit in a second resonance range, wherein said first and second resonance ranges differ.

2. The vibration equalization device as recited in claim 1, further comprising a third pendulum element operatively arranged on the first or second flywheel to counteract vibrations of said drive unit in said first resonance range, said second resonance range, or a third resonance range.

3. The vibration equalization device as recited in claim 1, wherein said first and second flywheels are formed by a component selected from the group consisting of a damper, a pressing plate, a central carrier, and a clutch housing.

4. The vibration equalization device recited in claim 1, further comprising a friction clutch for detachably connecting a drivetrain to the drive unit, the friction clutch comprising:
a friction system having at least one pressing plate and at least one friction disk;
a clutch housing in which the at least one pressing plate is rotationally fixed;
an input shaft; and,
at least one output shaft.

5. The vibration equalization device recited in claim 4, wherein the drive unit is situated in a motor vehicle ahead of a driver's compartment and transversely to a longitudinal axis of the motor vehicle.

6. The vibration equalization device as recited in claim 1, wherein each of said first and second pendulum elements is arranged symmetrically on the flywheel.

7. A method for adjusting first and second resonance ranges of a centrifugal pendulum device for providing vibration isolation in a power take-off system in a drive unit, the centrifugal pendulum device comprising a first pendulum element having a first mass, said first pendulum element operatively arranged on a first flywheel to counteract vibrations of said drive unit in the first resonance range, and a second pendulum element having a second mass, said second pendulum element operatively arranged on a second flywheel to counteract vibrations of said drive unit in the second resonance range, wherein said first and second resonance ranges differ, the method comprising adjusting the resonance ranges by at least one of the following actions:
suspending said pendulum elements at various radii;
providing different oscillation path tracks of said pendulum elements;
varying the first mass and/or varying the second mass; or
suspending said pendulum elements on various oscillation elements.

* * * * *